April 5, 1938.  C. BREER ET AL  2,113,075
MOTOR VEHICLE BODY
Original Filed March 11, 1935   4 Sheets-Sheet 4

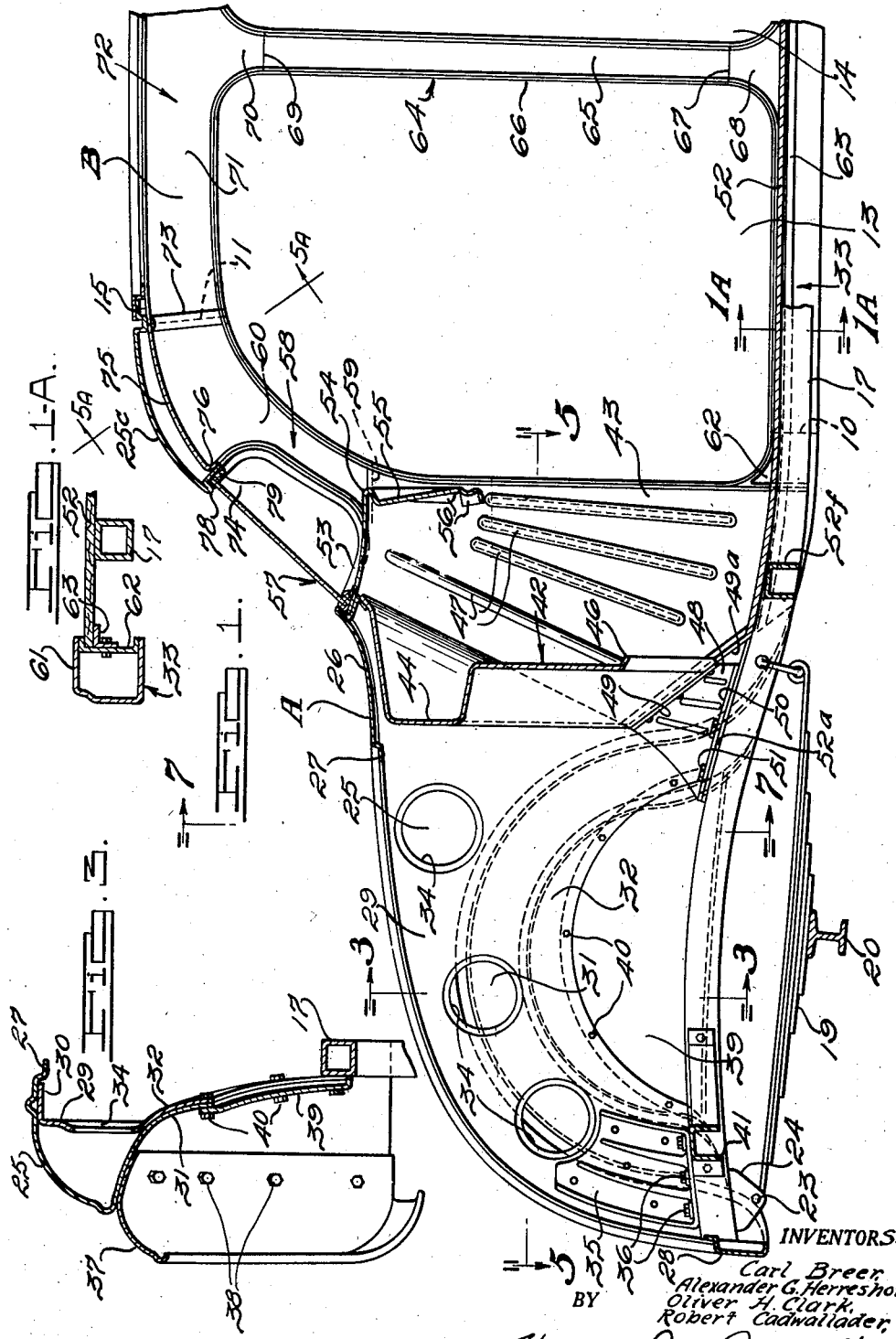

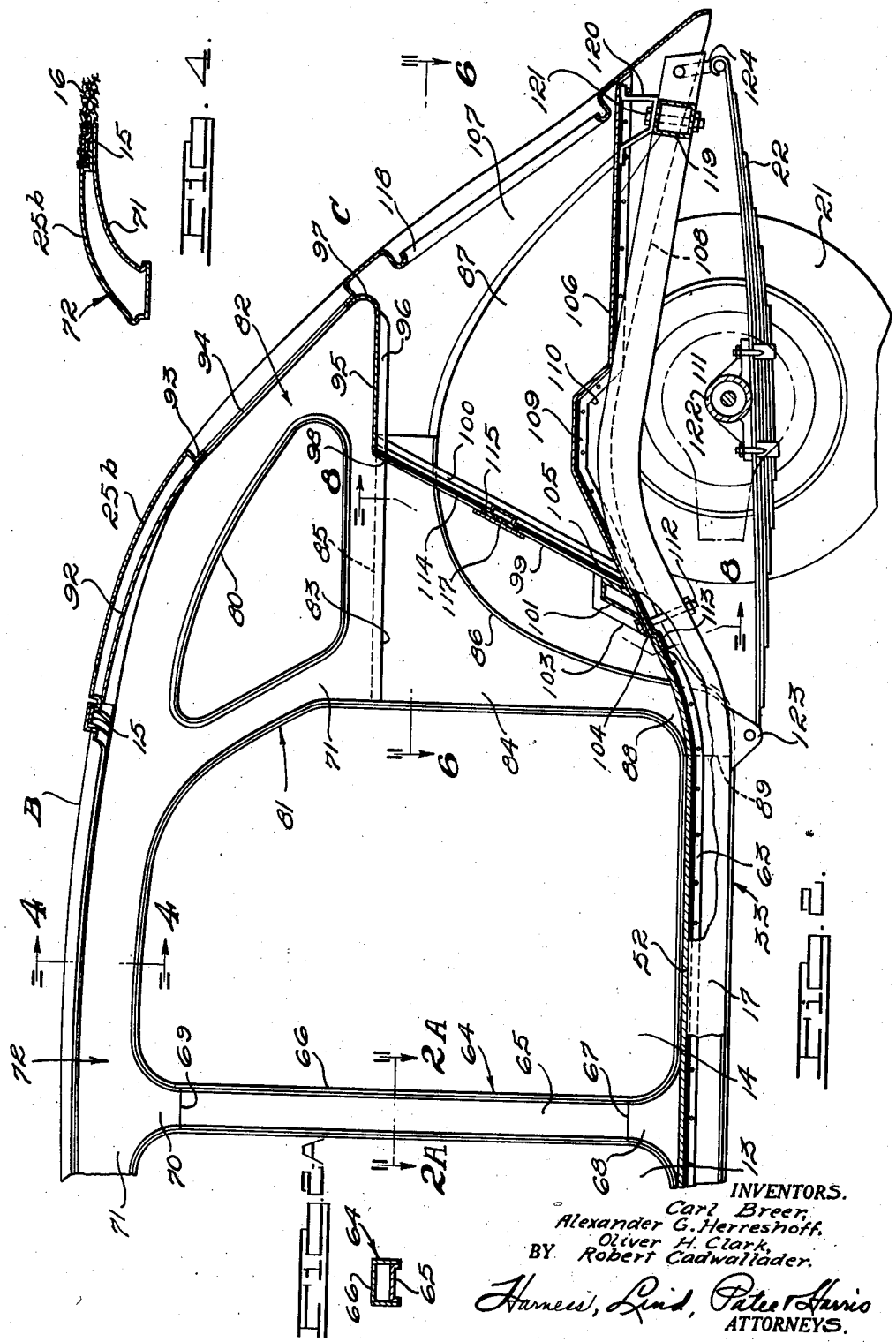

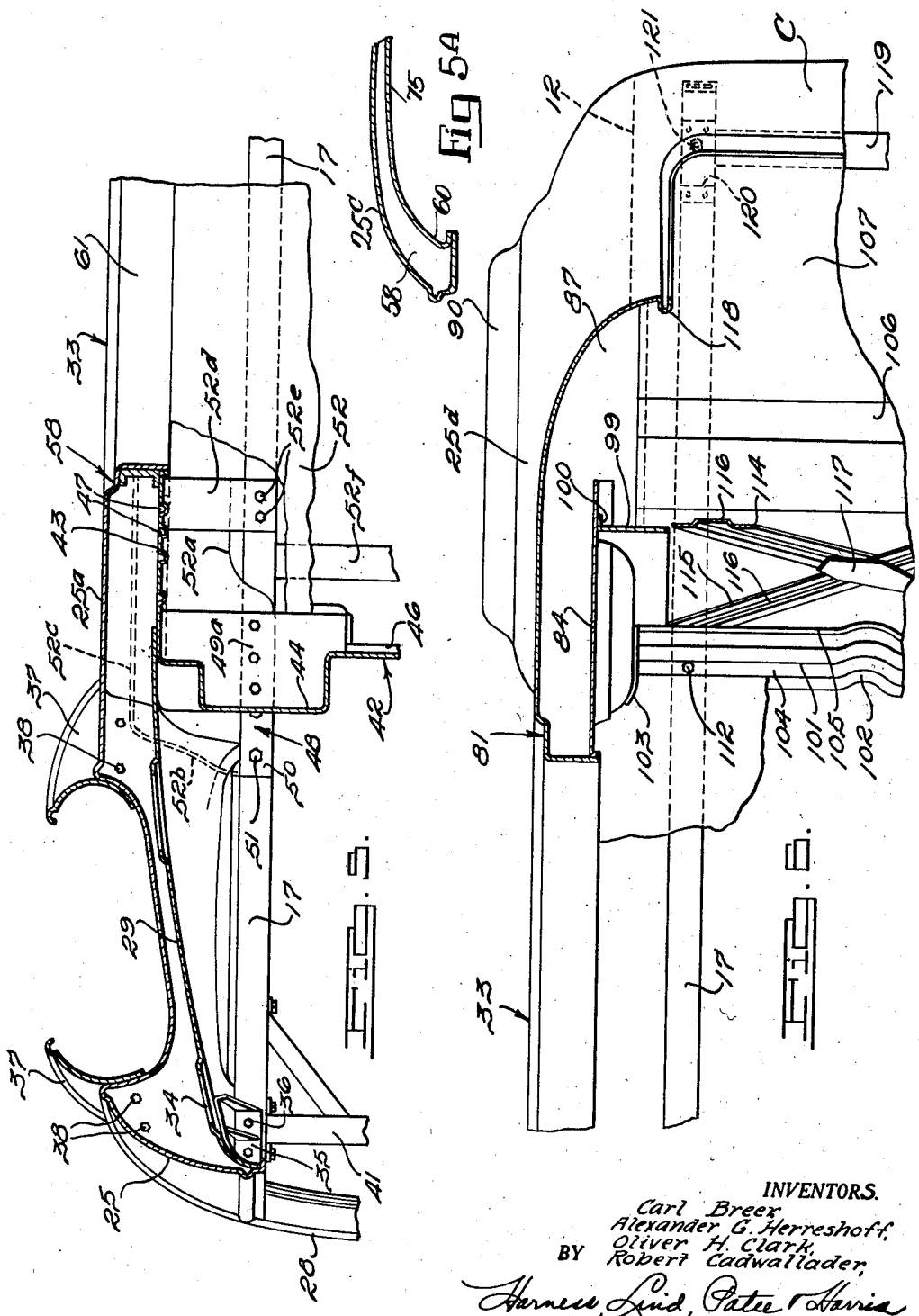

INVENTORS.
Carl Breer,
Alexander G. Herreshoff,
Oliver H. Clark,
BY Robert Cadwallader.
Harness, Lind, Peter Harris
ATTORNEYS.

Patented Apr. 5, 1938

2,113,075

UNITED STATES PATENT OFFICE 2,113,075

MOTOR VEHICLE BODY

Carl Breer, Grosse Pointe Park, Alexander G. Herreshoff, Grosse Pointe Village, Oliver H. Clark, Detroit, and Robert Cadwallader, Highland Park, Mich., assignors to Chrysler Corporation, Highland Park, Mich., a corporation of Delaware Application March 11, 1935, Serial No. 10,402
Renewed March 8, 1937

33 Claims. (Cl. 296—28)

This invention relates to motor vehicles and refers more particularly to improvements in body structures of motor vehicles.

It is an object of our invention to provide a motor vehicle body structure having improved characteristics of strength and rigidity.

A further object of our invention is to provide a body structure fabricated in an improved manner largely from panels, connected together to provide a substantially unitary rigid structure having improved strength and durability.

Another object of our invention in a more limited aspect thereof is to provide an improved body structure having the component parts thereof largely connected by welding.

Another object of our invention is to provide a body structure of relatively great strength and rigidity for the weight thereof.

Further objects of our invention are to provide a body comprising an improved truss-like structure; to provide a body structure fabricated in an improved manner to afford relatively great strength accompanied by improved stress distribution between the structural body parts, and freedom from rattle or wearing between the component body parts; and to provide an improved steel body structure adapted for manufacture at relatively low cost commensurate with the advantages obtained by reason of our construction.

An additional object of our invention is to provide a truss-like body structure adapted to efficiently distribute the stresses throughout the body incident to its weight and to the loads applied thereto from the ground wheels.

A further object of our invention in its more limited aspects is to provide a body structure fabricated in a novel manner from pre-formed, built-up, or assembled main body panels or sub-assembly units.

Further features of our invention relate to the provision of novel relatively strong, durable, and efficient joint structures or connections between the various component parts of our body structure; to the provision of improved means for utilizing the plates, panels, or shells of the body structure to carry a portion of the stresses; and to the provision of improved means for bracing the body parts.

An additional important object of our invention is to provide a body structure adapted to distribute the stresses therethrough largely by utilizing the outside skin or panel of the body reinforced by the provision of inner panels spaced from the outer panels to provide, in effect, a plurality of rigid but light weight hollow beam-like body portions.

Further objects and advantages of our invention will be more apparent from the following illustrative embodiment thereof, reference being had to the accompanying drawings, in which:

Fig. 1 is a sectional elevational view of a portion of the vehicle body forwardly of the intermediate door post, the section being taken approximately along the vertical longitudinal midplane of the body.

Fig. 1A is a detail sectional view through a body lower side rail, the section being taken along the line 1A—1A of Fig. 1.

Fig. 2 is a similar view rearwardly of the intermediate door post.

Fig. 2A is a detail sectional view along line 2A—2A of Fig. 2.

Fig. 3 is a sectional elevational view through line 3—3 of Fig. 1 illustrating one of the hollow cowl beam structures.

Fig. 4 is a detail sectional view taken along the line 4—4 of Fig. 2.

Fig. 5 is a sectional plan view through one of the forwardly extending hollow cowl beams, the section being taken along the line 5—5 of Fig. 1.

Fig. 5A is a detail sectional view taken as indicated by line 5A—5A of Fig. 1 through the upper end portion of one of the front columns.

Fig. 6 is a sectional plan view through the rear portion of the body structure, the section being taken along the line 6—6 of Fig. 2.

Figure 7:
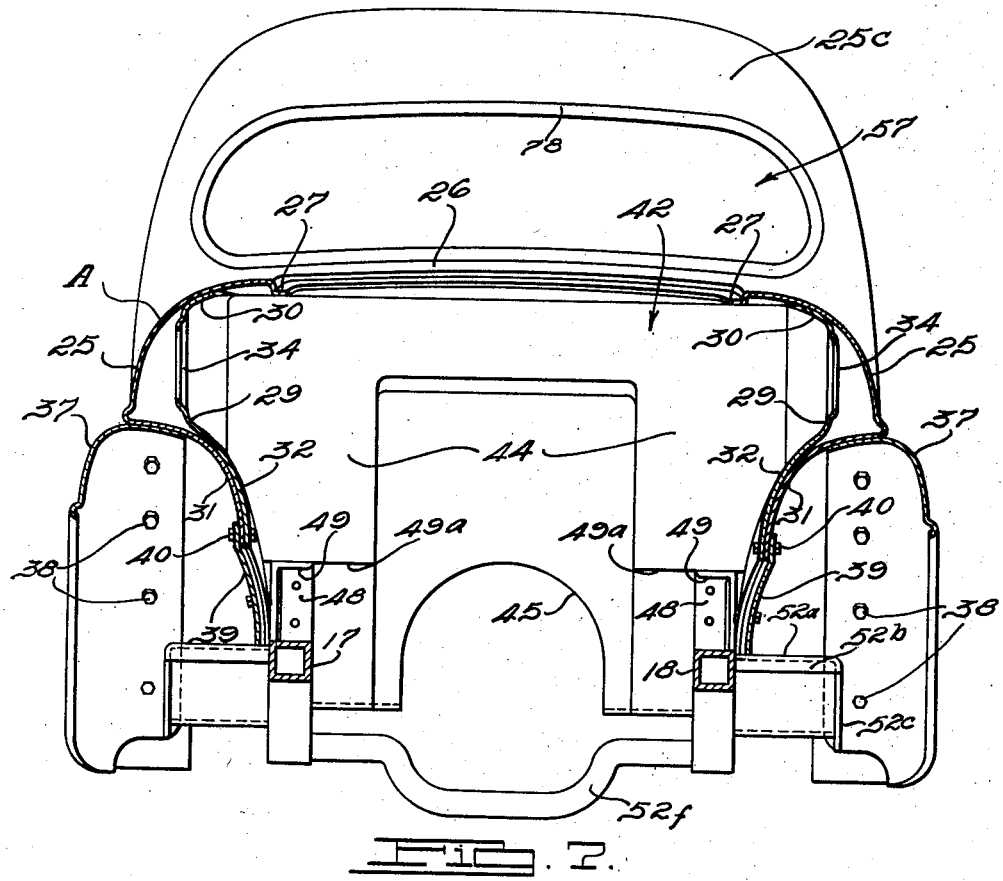
Fig. 7 is a sectional elevational view transversely through the body, the section being taken along the line 7—7 of Fig. 1.

Referring to the drawings, we have illustrated our invention in connection with a motor vehicle body of the closed type which, for a four door type sedan, may have the general appearance illustrated in Figs. 1 and 2. It will be understood that, in its broader aspects our invention is not limited to any particular appearance, type or shape of the body of the motor vehicle as a whole as these may vary within wide limits according to preference.

Our body structure is, in general, of all-steel unitary construction fabricated largely from steel panels, shells, or the like, columns and braces. The component parts are preferably for the most part welded into one unitary rigid structure of improved strength and durability. We prefer to largely weld the component parts of the body structure since, among other advantages, the welding provides permanence of assembly, relatively great strength accompanied by efficient stress transference between the welded parts, freedom from rattle or weaving between the various parts, and reduction in weight and manufacturing cost of the body structure as a whole.

Rivets or bolts may be employed to facilitate the final assembly of certain main assemblies to other main structures and we desire to point out that, in the broader aspects of our invention, we do not limit our invention to the particular type of connecting means hereinafter more particularly described in order to illustrate one concrete form which our invention may assume, it being readily apparent that other fastening means may be employed as desired.

In general, according to the illustrated preferred embodiment of the principles of our invention, we have provided a body construction which may be fabricated from a plurality of pre-formed, built-up or assembled main body panels forming sub-assembly units although, if desired, the entire body structure may be fabricated or built-up without first providing the aforesaid pre-formed sub-assemblies. We prefer, however, to provide such pre-formed units as the manufacture, assembly, and servicing of the body structure is greatly facilitated thereby. In practice, these sub-assemblies may vary, as desired, both in the number of such main sub-assembly structures and in the formation of the structural parts thereof within keeping of the broader principles of our invention.

According to the illustrated embodiments of our invention, the body structure is preferably formed of four main structural portions adapted to be welded together to form a rigid unitary body structure, such main portions comprising the front body section A, the similar body side panels B, and the body rear panel C.

The front section A, as will be apparent from Fig. 1, is connected by welding to the side panels B as generally indicated at 10 and 11. The side panels B are connected by welding to the rear panel C along meeting edges of the side and rear panels as generally indicated at 12 in Fig. 6.

It will be understood that the various welded joints do not appear when the finished body is viewed since the external welds are covered by the usual enamel-like paint and the internal welds which are not otherwise hidden from view by the body structure itself are covered by the interior trim and finish customarily employed in general body practice or else by paint or other finish panels as desired. Our invention is more particularly directed to the body structure, and the details of the trim, finish and the like, will, for the most part, be omitted from our disclosure.

The side panels B in the case of the sedan type of body each provide openings 13 and 14 for the usual front and rear doors (not shown). The main body assemblies A, B and C together provide the roof opening 15. This roof opening is filled in with a suitable cover structure 16 illustrated in Fig. 4.

While, within the broader aspects of our invention, the body structure may be directly supported as a rigid unit by the vehicle road wheels with appropriate springing intermediate the wheels and body, we prefer according to the illustrated embodiment of our invention to provide a vehicle chassis including the main side rails or sills 17, 18 (see Fig. 7) and suitable cross members. This chassis structure is relatively light in weight and is provided primarily to facilitate the manufacture and assembly of the motor vehicle whereby the chassis may be assembled and the body structure assembled independently thereof as a separate unit. The body assembly may then be conveniently mounted on the chassis assembly and welded or bolted thereto as will be presently more apparent.

The chassis side rails 17 and 18 are tension members and are adapted to transmit a portion of their load in a novel manner to the body structure, the latter receiving the major portion of the total load directly at the points of body support for distribution of the stresses throughout the truss-like body structure.

Thus, each usual front steering ground wheel (not shown) is sprung in any desired manner as by the leaf spring 19 associated with the front axle 20 as shown in Fig. 1. These springs 19 are respectively connected to the chassis rails 17 and 18 at the forward and rear ends preferably at or close to points where main compression members of the body frame join the chassis rails whereby the major portion of the stresses passes directly to the body structure. Likewise the rear driving ground wheels 21, one of which is shown in Fig. 2, are connected through rear supporting springs 22 to the chassis rails 17 and 18 at or adjacent to points of load distribution to the body structure. Other well-known or suitable forms of wheel springing may be employed as desired within keeping of the spirit of our invention.

It will be understood that the body and chassis structures are for the most part symmetrical about the longitudinal vertical central plane through the vehicle so that in most instances the description will be limited to the typical structure along the right hand half of the body. The forward end of spring 19, as best seen in Fig. 1, is pivoted to a supporting shackle bolt 23 carried by the downwardly extending shackle bracket 24 fixed to rail 17 at the forward end thereof.

Each cowl beam structure has an outer panel or skin 25 forming the outer finish of the body, these panels merging rearwardly to provide the transverse cowl panel 26. The outer panels 25 curve upwardly and inwardly as shown in Figs. 3 and 7 and each terminates in a transversely spaced offset lip or hood-receiving flange 27. These flanges 27 merge transversely at the rear and extend forwardly and downwardly to the lower ends of the cowl beams thus providing a space to receive the vehicle engine, radiator, and other usual hood-enclosing vehicle parts all of which are omitted from our disclosure as they do not form a part of our present invention. The flanges 27 support a hinged hood cover, this hood being also omitted from our disclosure.

For stiffening the lower depending ends of the cowl beams transversely thereof, these cowl beams may be connected by a cross brace 28 which may be formed by extending the lower end portions of the outer panels 25 inwardly, the cross brace thus being unitary with the side panels in similar fashion to the merging of these panels to provide the aforesaid cowl panel 26. If desired other cross braces between the cowl beams may be provided.

Cooperating with each outer panel 25 to provide a hollow cowl beam structure is an inner vertical plate or wall member 29 which has an inwardly extending flange 30 at its upper end underlying the inner portion of panel 25 and welded thereto as shown in Fig. 3, the hood supporting flange 27 being thereby reinforced.

Each panel 25 has an inwardly and downwardly curved flange 31 to which is welded the lower curved end 32 of the plate 29, the portions 31 and 32 being arched to provide a wheel house from the front end of the cowl beam rearwardly into structural continuity with one of the main body side rails 23, as will be presently more apparent.

The plate 29 has a series of openings 34 peferably provided with a flanged border whereby the plate is relatively light in weight and resistant against distortion. The plate 29 extends forwardly and downwardly for connection to the chassis rail 17 by a ribbed bracket 35 bolted at 36 to the rail 17. The bracket 35 is riveted or welded to plate 29.

Each cowl beam structure provides a housing for a front wheel and has associated therewith a fender 37 removably attached by bolts 38 to the flange 31 of outer panel 25. The arcuate marginal edges of the flanges 31 and 32 provide an opening above rail 17 for convenient access through the wheel house structure to the engine for servicing, and adjusting parts thereof. Fender 37 is readily removable to facilitate the servicing operations and likewise a cover plate 39 is removably secured by fasteners 40 to flanges 31 and 32 for normally closing said opening.

Suitable cross-braces 41 may be provided at appropriate points between chassis rails 17 and 18 for supporting the engine, transmission, etc., and for strengthening the chassis.

Extending transversely between the rear ends of the vertical plates 29 is a dash member 42, the latter having longitudinal walls 43 spaced within the outer side portions 25$^a$ of the outer shell 25 and being welded to the rear ends of a plate 29. The dash 42 has the side reinforcing return bent portions 44 underlying cowl panel 26. The central lower edge of the dash 42 is arched at 45 (see Fig. 7) to accommodate rearwardly extending parts of the power plant (not shown). The lower edge of the dash has a stiffening flange 46 and the walls 43 are flared upwardly from the chassis rails to direct the stresses toward the roof rails as will be presently apparent, these walls having generally vertical stiffening ribs 47 lying in the direction of the forces transmitted through these walls.

For removably securing the dash 42 to the chassis rails, we have provided the channeled side brackets 48 each having an upper flange 49 riveted or welded to the rearwardly and downwardly sloping bottom 49$^a$ face of the dash 42 while the lower flange 50 is removably secured to a rail, such as the rail 17, by fastener bolts 51. The flange 46 supports a floor, a portion of which is shown at 52 in Figs. 1 and 5.

Intermediate flange 50 of bracket 48 and chassis rail 17 is a substantially horizontal shear plate 52$^a$ also secured to the chassis rail by the bolts 51. This shear plate is adapted to transmit a portion of the load from the chassis rail for distribution, not only to dash 42, but also to the adjacent front wheel house and to the front column 58, it being understood that a similar shear plate is associated with rail 18 at the opposite side of the body.

The shear plate 52$^a$ projects laterally outwardly from rail 17 and has a border flange 52$^b$ fitting the contour of the front wheel house and also has a portion 52$^c$ underlying the bottom panel portion of the column 58 between plates 25$^a$ and 43 rearwardly of the wheel house. The flange 52$^b$ and portion 52$^c$ are welded to the aforesaid parts. Such structure further laterally braces the wheel house, column, and chassis rail with the dash included in this rigid assembly. A bracket 52$^d$ is welded to the lower part of column 58 adjacent the rear edge thereof, this bracket extending inwardly for attachment to the upper face of rail 17 by bolts 52$^e$, the plate 52$^a$ being welded to the underface of bracket 52$^d$.

The rails 17, 18 are further transversely connected by a cross member 52$^f$ which serves to support the rear end of the power plant assembly (not shown).

The cowl panel 26 has welded thereto a transverse brace plate 53 which extends rearwardly to provide a shelf rearwardly of windshield 57 and and then is return-bent at 54 for strengthening the depending instrument panel 55. This panel has side flanges 56 welded to the side walls 43.

The inner wall 29 of each cowl beam acts as a component thrust member between the chassis rail 17 and a forward front door pillar or column 58 by reason of the bracket 35 at the front of plate 29 and at the rear thereof by reason of the inner side wall 43 forming a rear extension of wall 29, the upper rear edge of wall 43 being welded in overlapping relation to the lower end 59 of a channel 60 forming the inner wall of hollow column 58 as best seen in Fig. 1.

The lower vertical portion of column 58 is formed, as shown in Figs. 1 and 5, by the spaced inner and outer plates 43 and 25$^a$, the latter terminating at the aforesaid weld joint 10 although in effect it continues as an integral plate to form the door sill as aforesaid. The plate 43 has its lower rear edge welded to the inner channel member 62 which likewise continues rearwardly of the weld joint 10, the channeled members 61 and 62 forming the hollow bottom body sill or side rail 33.

In Fig. 1A it will be noted that the inner channel 62 of body rail 33 carries an angle bracket 63 and between this bracket and the upper flange of channel 62 the floor 52 is supported. The floor extends across the body to the other lower body rail at the other side, the floor resting on the chassis rails 17 and 18.

The intermediate column 64 has an inner channeled member 65 and an outer channel 66 formed by the skin 25 in continuity with the bottom sill portion 61. The inner channel 65 is welded at 67 to arm 68 of the rail channel 62 and at 69 to the arm 70 of the inner channel member 71 of the body top sill or rail 72, the latter being welded at 11 to the upwardly and rearwardly projecting end of the front column 58.

The top rail 72 (see Fig. 4) is also of hollow beam structure and has an outer deep channel 25$^b$ welded to the inner channel 71, the channel 25$^b$ being a continuation of the outer shell 25. It should be understood that weld joints 10 and 11 may have their parts overlapped or suitable members inserted in the rails at the joints arranged in overlapping relationship with the joints for strengthening the joints, our disclosure for simplicity indicating the weld joints in simple structural form. In Fig. 1 the weld joint 11 includes a bead member 73 which covers the weld line.

The outer skin 25 extending upwardly from columns 58 and 64 is bent outwardly as shown in Fig. 4 from the top rail 72 and inwardly thereabove to provide the channeled roof opening 15 for supporting any suitable roof structure shown in simple form at 16 in Fig. 4. In Figs. 1 and 2 the roof structure is largely omitted. The outer shell 25ᵃ at the front slopes downwardly at 25ᶜ to form the windshield supporting flange 74, the inner wall 60 having a beam forming stiffener portion 75 extending across the top of the body and spaced within the outer skin portion 25ᶜ to provide a hollow beam structure above the windshield 57. The portion 75 is welded along its lower flanged edge 76 to the flange 74.

The windshield frame 57 is welded at its lower edge to the cowl plate 53, the upper and side edges being welded between the return bent bead 78 of outer shell portion 25ᶜ and a bead member 79 welded to flange 74.

Figure 8:
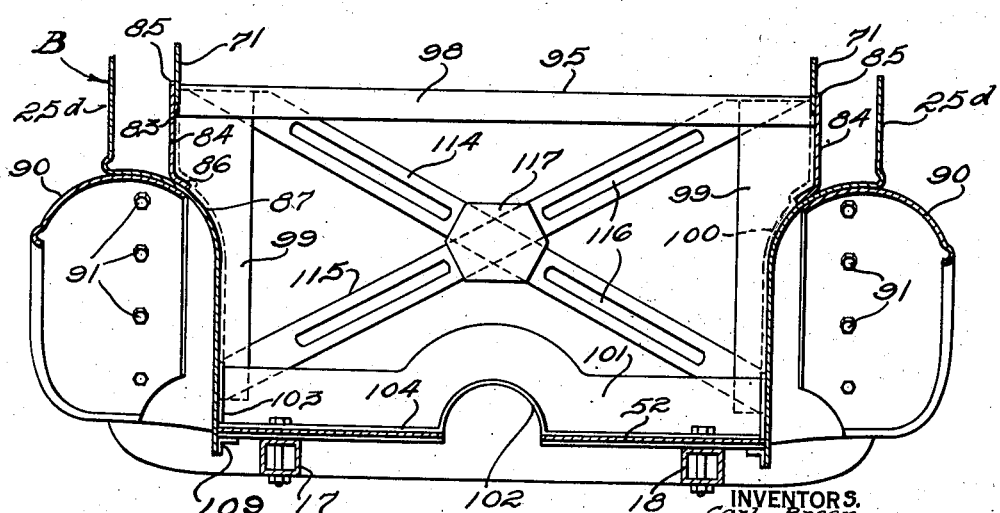
Fig. 8 is a sectional elevational view transversely through a portion of the rear of the body structure, the view being taken along the line 8—8 of Fig. 2.

The typical top body rail 72 continues rearwardly beyond the intermediate column 66 and then divides around a window 80 to form the rear hollow column or door pillar 81 and the inclined rear extension 82 of top rail 72. The aforesaid plate 71 thus forms the inner channeled member of column 81 and extension 82, terminating at 83 where another plate 84 has its upper edge 85 overlapped with edge 83 and welded thereto. The plate 84 thus provides a downward extension of plate 71 and, as shown in Figs. 2 and 8, has a lower inturned flange 86 welded to the arched rear wheel house structure 87. The wheel house 87 extends outwardly from plate 84 to provide the lower part of the hollow column 81, the latter structure terminating in a forward foot 88 welded at 89 to the bottom rail 33 so that the rail 33 and column 81 are structurally continuous.

It will be understood that the outer shell 25ᵈ of column 81 is a downward extension of the outer shell 25ᵇ of top rail 72. The rear wheel fender 90 is removably secured by fasteners 91 to the wheel house 87. The outer skin at 25ᵇ extends rearwardly and around the curved rear portion of side section B to the weld line 12 for welding to the rear panel C.

Above the window 80, the inner plate 71 extends inwardly at 92 spaced from the outer shell 25ᵇ to provide a rigid transverse hollow beam, the outer shell having a shouldered flange 93 welded to plate 92 to form therewith a window frame for the window opening 94.

For rigidly connecting the side sections B across the rear of the body, we have provided the transverse shelf brace 95 having side flanges 96 welded along the lower edge 83 of the plate 71 rearwardly below window 80, the shelf 95 curving at 97 to continue upwardly and forwardly around rear window 94 to provide the aforesaid inner panel 92. The forward edge of shelf 95 has a downwardly inclined stiffener flange 98 to the rear faces of which are welded the side inclined stiffener plates 99. Each of these side plates has a side flange 100 (see Figs. 6 and 8) welded to the inner column plate 84 and wheel house 87, the lower end of each plate 99 being welded to the rear face of a transverse channeled cross brace 101.

The central part of brace 101 is arched at 102 to accommodate the propeller shaft (not shown) it being understood that a tunnel-like housing for the propeller shaft extends between arches 45 and 102. The tunnel structure is not illustrated as it is well known in the art and in order to best illustrate the body structure the sections for the views in Figs. 1 and 2 are taken just to one side of the longitudinal central plane of the vehicle so that the tunnel is not disclosed.

The channel brace 101 has its ends flared at 103 for welding to a wheel house 87, the front and rear flanges 104 and 105 thereof being welded to a rear floor 106 for the rear compartment or storage space 107. The lower edge of the wheel house 87 is indicated at 108 in Fig. 2 and for additionally supporting floor 106 each wheel house has welded thereto an angle bracket 109 arched at 110 in the path of swing of the rear axle central driving structure 111 to provide clearance therefor.

Bolts 112 removably secure the brace 101, and therefor the body parts connected thereto, with the chassis rails 17 and 18. The floor 106 lies flush at its forward edge with the rear edge of floor 52, the floor 106 having the offset forward edge 113 for this purpose.

The inner plates 71 and shelf 95 are braced between the wheel house structure 87 and cross brace 101 by a pair of crossed diagonal brace members 114 and 115 each having stiffener ribs 116 depressed therefrom. Each of the diagonal braces has an upper end welded to flange 98 and a side brace 99 while the lower ends of the diagonal braces are each welded to and between a side brace 99 and the cross brace 101. A central stiffener plate 117 is welded to the crossed portions of diagonal braces 114 and 115 whereby a very rigid cross bracing for the body sides is obtained. The inclined cross bracing provided by braces 114 and 115 further serves as the back rest for the rear seat (not shown).

The back panel C has an opening bounded by a flange 118 to provide access to the baggage compartment 107 rearward of braces 114 and 115, the flanged opening being adapted to receive a suitable hinged door closure (not shown).

The rear portion of the body structure is braced by a transverse hollow brace member 119 having its ends welded to the chassis rails 17 and 18. Fixed to floor 106 and depending from each side thereof is a bracket 120 adapted to removably attach the body structure to the chassis rails by bolts 121.

The rear driving wheels 21 are supported by an axle 122 carried by the rear springs 22 shackled forwardly at 123 to chassis 17 at the juncture of the column 81 whereby a portion of the chassis load is transmitted to the body structure, it being further noted that the braces 114, 115, 101 and 99 further serve to transmit a portion of the stresses to the body structure.

The rear end of each rear spring 22 is shackled at 124 adjacent the rear end of one of the chassis rails, a portion of the load passing through the brackets 120 and thence to the rear section C as well as to wheel house structures 87 for distribution to the body structure.

We find it expedient, by way of example, to completely assemble the front section A and then to join this assembly with a rear assembly formed of the side panels B together with the rear panel C and the various cross bracings, the completely assembled body structure being then bolted to the chassis structure.

It will be apparent that we have provided a body structure wherein a truss construction is employed to resist the applied forces through definite structural members in which the primary stresses are the simple stresses of tension or compression, the severe bending stresses present in conventional types of automobile bodies and frames being largely eliminated. The outer stamped shell or skin 25 is utilized as a stressed member, the various hollow beams being formed by an inner stamped shell spaced from the outer shell. Portions of these shells may be made in appropriate stampings welded together. The body and chassis longitudinally extending lower side rails 33, 17 and 18 are in tension and the forward cowl beams and structurally connected body top rails 72 are in compression when a static load, due to the weight of the vehicle and passengers, is on the wheels. The spaced plates 84 and 25<sup>d</sup> form sides of a rigid hollow beam supplemented by the shelf brace 95 to provide an oblique bracing from the rear section C to the rear load point or region provided by the rear spring shackle 123. The seat back braces 114 and 115 also assist in providing a similar bracing of this character.

The spring reactions are transmitted largely to the body structure in an improved manner, the front spring reaction and engine loads being transmitted directly through the rearwardly and upwardly inclined cowl beam structures and dash 42 of the front body section A to the front door columns 58 and top rails 72. The body shell or outer skin, in most instances, is constructed to take a portion of the loads in conjunction with stiffener plates forming hollow beams therewith and thereby minimizing the body weight.

With particular reference to Fig. 5 it will be noted that each forward side column 58 includes the inner and outer transversely spaced panels 43 and 25<sup>a</sup> respectively, these panels having a relatively great longitudinal dimension in forming the hollow column of relatively great longitudinal dimension compared to the transverse dimension. Intermediate the longitudinal lengths of these columns 58 the dash structure 42 extends transversely to structurally connect the columns.

The hollow compression cowl beam structures include structural extensions of column panels 43 and 25<sup>a</sup> (see Figs. 1, 3 and 5) primarily by reason of the inner plate or wall member 29 and outer panel 25. Thus each side cowl beam structure forms, in effect, a hollow compression resisting strut extension which (see Fig. 1) projects forwardly and downwardly from a column 58 to support the front end of the body on rails 17 and to transmit compression forces therefrom through the cowl beams and columns 58 to the top rails 72. The downwardly projecting end of each of the cowl beams or compression strut structures, at the bracket 35, is thus spaced forwardly of a column 58.

While the chassis sills may be dispensed with, if desired, and the total loads taken directly by the body structure, we prefer largely for manufacturing and assembly convenience to provide the relatively light chassis structure as illustrated although even in such instance the loads are largely taken by the trussed body structure.

Various modifications and changes will readily be apparent from the teachings of our invention and many changes may be made within the scope and spirit of our invention as defined in the appended claims, our invention in its broader aspects not being limited to the foregoing described illustrative embodiment.

We claim:

1. In a motor vehicle body structure having a driver's compartment, longitudinally extending laterally spaced rails located forwardly of said compartment and adapted for structural connection to said body structure, a pair of laterally spaced hollow beam structures extending forwardly of said compartment and downwardly toward the front ends of said rails to form the front end of said body structure, a reinforcing connector bracket supported by the front end of each of said rails and respectively connected to the downwardly extending ends of said hollow beam structures, ground wheel supporting means connected to said rails and adapted to transmit a portion of the body supporting forces upwardly through said connector and hollow beam structures toward said compartment, each of said hollow beam structures providing a wheelhouse, said body structure including laterally spaced door column structures forwardly at the sides of said compartment, and means for structurally connecting said hollow beam structures respectively to said door column structures.

2. In a motor vehicle body structure having a driver's compartment, longitudinally extending laterally spaced rails located forwardly of said compartment and adapted for structural connection to said body structure, a pair of laterally spaced hollow beam structures extending forwardly of said compartment and downwardly toward the front ends of said rails to form the front end of said body structure, a reinforcing connector bracket supported by the front end of each of said rails and respectively connected to the downwardly extending ends of said hollow beam structures, each of said connector brackets having a substantially horizontal flange seated on one of said rails and having a channeled face portion forming said connection to one of said hollow beam structures, ground wheel supporting means connected to said rails and adapted to transmit a portion of the body supporting forces upwardly through said connector brackets and hollow beam structures toward said compartment, each of said hollow beam structures providing a wheelhouse, said body structure including laterally spaced door column structures forwardly at the sides of said compartment, and means for structurally connecting said hollow beam structures respectively to said door column structures.

3. In a motor vehicle body structure having a driver's compartment, longitudinally extending laterally spaced rails located forwardly of said compartment and adapted for structural connection to said body structure, a pair of laterally spaced hollow beam structures extending forwardly of said compartment and downwardly toward the front ends of said rails to form the front end of said body structure, a reinforcing connector bracket supported by the front end of each of said rails and respectively connected to the downwardly extending ends of said hollow beam structures, ground wheel supporting means connected to said rails and adapted to transmit a portion of the body supporting forces upwardly through said connector brackets and hollow beam structures toward said compartment, each of said hollow beam structures providing a wheelhouse, said body structure including laterally spaced door column structures forwardly at the sides of said compartment, and means for structurally connecting said hollow beam structures respectively to said door column structures, each of said hollow beam structures including a panel forming the outer shell of the front portion of the body structure and a stiffener plate located inwardly thereof, said stiffener plates being directly loaded by said connector brackets.

4. In a motor vehicle body structure having a driver's compartment, longitudinally extending laterally spaced rails located forwardly of said compartment and adapted for structural connection nection to said body structure, a pair of laterally spaced hollow beam structures extending forwardly of said compartment and downwardly toward the front ends of said rails to form the front end of said body structure, a reinforcing connector bracket supported by the front ends of each of said rails and respectively connected to the downwardly extending ends of said hollow beam structures, means for removably securing said connector brackets to said rails, ground wheel supporting means connected to said rails and adapted to transmit a portion of the body supporting forces upwardly through said connector brackets and hollow beam structures toward said compartment, each of said hollow beam structures providing a wheelhouse, said body structure including laterally spaced door column structures forwardly at the sides of said compartment, and means for structurally connecting said hollow beam structures respectively to said door column structures.

5. In a motor vehicle structure having a driver's compartment, a pair of laterally spaced compression structures extending forwardly of said compartment and downwardly to form the front end of the body structure, said compression structures curving to provide wheelhousings and each including an outer panel forming the outer shell of the body front portion and an inner plate member, a transverse dash member adapted to laterally brace said compression structures, said outer panel and one of said members extending rearwardly to provide a hollow front door column forwardly of said compartment.

6. In a motor vehicle structure having a driver's compartment, a pair of laterally spaced compression structures extending forwardly of said compartment and downwardly to form the front end of the body structure, said compression structures curving to provide wheelhousings and each including an outer panel forming the outer shell of the body front portion and an inner plate member, a transverse dash member adapted to laterally brace said compression structures, said dash member having rearwardly extending side portions thereof spaced from said outer panels to provide hollow front door columns forwardly of said compartment.

7. In a motor vehicle structure having a driver's compartment, a pair of laterally spaced compression structures extending forwardly of said compartment and downwardly to form the front end of the body structure, said compression structures curving to provide wheelhousings and each including an outer panel forming the outer shell of the body front portion and an inner plate member, a transverse dash member adapted to laterally brace said compression structures, said dash member having rearwardly extending side portions thereof spaced from said outer panels to provide hollow front door columns forwardly of said compartment, said dash side portions having a stiffening rib pressed therefrom in the general direction of said columns formed thereby.

8. In a motor vehicle structure having a driver's compartment, a pair of laterally spaced compression structures extending forwardly of said compartment and downwardly to form the front end of the body structure, said compression structures curving to provide wheelhousings and each including an outer panel forming the outer shell of the body front portion and an inner plate member, a transverse dash member adapted to laterally brace said compression structures, longitudinally extending laterally spaced rails located forwardly of said compartment and adapted for structural connection to said body structure, a connector bracket carried by each of said rails and secured to said dash member, and ground wheel supporting means connected to said rails and adapted to transmit a portion of the body supporting forces upwardly through said compression structures, connector brackets and dash member toward said compartment.

9. In a motor vehicle structure having a driver's compartment, a pair of laterally spaced compression structures extending forwardly of said compartment and downwardly to form the front end of the body structure, said compression structures curving to provide wheelhousings and each including an outer panel forming the outer shell of the body front portion and an inner plate member, a transverse dash member adapted to laterally brace said compression structures, longitudinally extending laterally spaced rails located forwardly of said compartment and adapted for structural connection to said body structure, a pair of longitudinally spaced connector brackets carried by each of said rails and respectively secured to one of said compression structures and to said dash member, and ground wheel supporting means connected to said rails and adapted to transmit a portion of the body supporting forces upwardly through said brackets, compression structures, and dash member toward said compartment.

10. In a motor vehicle body structure having a driver's compartment, a hollow door column forwardly of said compartment, said column including a forwardly extending outer panel and an inner panel spaced therefrom, said panels having forwardly extended structural portions spaced to provide a downwardly curved wheelhouse beam, and ground wheel supporting means adapted to load the forward end of said beam and the lower end of said column.

11. In a motor vehicle body structure having a driver's compartment, a hollow door column forwardly of said compartment, said column including a forwardly extending outer panel and an inner panel spaced therefrom, said panels having forwardly extended structural portions spaced to provide a downwardly curved wheelhouse beam, and ground wheel supporting means adapted to load the forward end of said beam and the lower end of said column, the upper end of said column extending rearwardly at the top of said body structure to provide a hollow longitudinal roof supporting compression beam.

12. In a motor vehicle body structure having a driver's compartment, a hollow door column forwardly of said compartment, said column including a forwardly extending outer panel and an inner panel spaced therefrom, said panels having forwardly extended structural portions spaced to provide a downwardly curved wheelhouse beam, and ground wheel supporting means adapted to load the forward end of said beam and the lower end of said column, the upper end of said column extending rearwardly at the top of said body structure to provide a hollow longitudinal roof supporting compression beam, said hollow roof beam projecting transversely of said body structure at the top of said column to provide a windshield frame receiving opening.

13. In a motor vehicle body structure, forward side column structures including inner and outer spaced panels of relatively great longitudinal dimension, and a transversely extending dash structure connecting said column structures intermediate said longitudinal dimensions thereof, the portions of said column structures which project forwardly of said dash structure being provided with forwardly and downwardly projecting strut extensions so constructed and arranged to provide support for the front end of the body structure.

14. In a motor vehicle body structure having a driver's compartment, hollow door columns forwardly at the sides of said compartment, said columns including spaced inner and outer panels, said inner and outer panels having spaced transversely connecting bridge portions forming a roof structure across the body structure above said column structures, said column structures and bridge portions providing a windshield receiving opening, and a compression strut structure extending forwardly and downwardly from each of said columns, the downwardly projecting ends of said strut structures being spaced forwardly of said columns, and a power plant supporting frame structurally connected between said strut ends and the lower ends of said columns.

15. In a motor vehicle body structure having a driver's compartment, a hollow door column forwardly of said compartment, said column including a forwardly extending outer panel and an inner panel spaced therefrom, said column having its upper end portion inclined rearwardly and the panels thereof having portions curving upwardly and rearwardly beyond said inclined column portion spaced to provide a hollow roof rail, the outer rail panel portion having its upper and lower longitudinally extending edges secured to the upper and lower longitudinally extending edges of the inner rail panel portion.

16. In a motor vehicle body structure having a driver's compartment, a hollow door column forwardly of said compartment, said column including a forwardly extending outer panel and an inner panel spaced therefrom, said column having its upper end portion inclined rearwardly and the panels thereof having portions curving upwardly and rearwardly beyond said inclined column portion spaced to provide a hollow roof rail, the outer rail panel portion having its upper and lower longitudinally extending edges secured to the upper and lower longitudinally extending edges of the inner rail panel portion, said connected upper edges of said rail panel portions forming a roof-receiving opening and said connected lower edges of said rail panel portions forming a door opening.

17. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel.

18. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel and having a window opening formed therein.

19. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel, said outer panel extension projecting downwardly beyond said inner panel extension and having an inwardly deflected portion below said inner panel extension providing a rear wheelhouse.

20. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel, said outer panel extension projecting downwardly beyond said inner panel extension and having an inwardly deflected portion below said inner panel extension providing a rear wheelhouse, and a brace panel extended below said inner panel extension and forming an inner wall for said column, said brace panel having a lower edge curved about said wheelhouse and secured thereto.

21. In a motor vehicle body structure, longitudinally extending chassis rails, wheel supporting means loading said rails at longitudinally spaced points at their forward end portions, said body structure having hollow front door columns provided with forwardly and downwardly extending compression members, means for securing the forward ends of said compression members adjacent one of said chassis rail load points, body lower side rails spaced outwardly from said chassis rails and connected to the lower ends of said columns, and side shear plates structurally connecting said chassis rails with said column structures in the vicinity of the other of said chassis rail load points.

22. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel, a lower body rail extending forwardly from said column, and a chassis rail spaced inwardly from said lower body rail and adapted to removably support said body structure.

23. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, and downwardly and forwardly inclined compression bracing means extending from each of said column structures, and means for securing the lower ends of said bracing means to said wheelhouse supporting means respectively generally rearwardly of said wheelhouse structures.

24. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, and downwardly and forwardly inclined compression bracing means extending from each of said column structures, and means for securing the lower ends of said bracing means to said wheelhouse supporting means respectively generally rearwardly of said wheelhouse structures, said column structures being respectively rearwardly inclined above the upper ends of said bracing means approximately in continuity with said bracing means, and a roof beam extending rearwardly from each of said column structures.

25. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, and downwardly and forwardly inclined compression bracing means extending from each of said column structures, means for securing the lower ends of said bracing means to said wheelhouse supporting means respectively generally rearwardly of said wheelhouse structures, said column structures being respectively rearwardly inclined above the upper ends of said bracing means approximately in continuity with said bracing means, a roof beam extending rearwardly from each of said column structures, and means including rear ground wheel supporting means adapted to load the rear portions of said roof beams.

26. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, a shear plate secured to the rear of each of said wheel houses, and means for structurally securing said shear plates to said rails respectively.

27. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, a shear plate secured to the rear of each of said wheelhouses, means for structurally securing said shear plates to said rails respectively, and brace means intermediate said shear plate and said column structures.

28. In a motor vehicle structure, forward side column structures including inner and outer spaced panels, each of said inner panels having a portion thereof projecting forwardly from one of said column structures, a front wheel supporting frame structure extending forwardly from said column structures, and stiffener means structurally associated with each of said inner panel portions and cooperating therewith to transmit load thrust from said frame structure directly to one of said column structures.

29. In a motor vehicle structure, forward side column structures including inner and outer spaced panels, each of said inner panels having a portion thereof projecting forwardly from one of said column structures, a front wheel supporting frame structure extending forwardly from said column structures, and forwardly and downwardly inclined stiffener means structurally associated with each of said inner panel portions and cooperating therewith to transmit load thrust from said frame structure directly to one of said column structures.

30. In a motor vehicle structure, forward side column structures including inner and outer spaced panels, each of said inner panels having a portion thereof projecting forwardly from one of said column structures, a front wheel supporting frame structure extending forwardly from said column structures, each of said inner panel portions having a return bent rib formed therein and so constructed and arranged as to transmit load thrust from said frame structure directly to one of said column structures.

31. In a motor vehicle structure, forward side column structures including inner and outer spaced panels, each of said inner panels having a portion thereof projecting forwardly from one of said column structures, a front wheel supporting frame structure extending forwardly from said column structures, stiffener means structurally associated with each of said inner panel portions and cooperating therewith to transmit load thrust from said frame structure directly to one of said column structures, each of said column structures having an upper portion sloped rearwardly from substantially the region of load thrust by said brace means, and upper roof rails forming rearwardly projecting extensions of said rearwardly sloped column structures.

32. In a motor vehicle structure, forward side column structures including inner and outer spaced panels, each of said inner panels having a portion thereof projecting forwardly from one of said column structures, a front wheel supporting frame structure extending forwardly from said column structures, and forwardly and downwardly inclined stiffener means structurally associated with each of said inner panel portions and cooperating therewith to transmit load thrust from said frame structure directly to one of said column structures, each of said column structures having an upper portion sloped upwardly and rearwardly in substantially the direction of inclination of said inclined brace means to form structural extensions of said brace means.

33. In a motor vehicle structure, forward side column structures including inner and outer spaced panels, each of said inner panels having a portion thereof projecting forwardly from one of said column structures, a front wheel supporting frame structure extending forwardly from said column structures, and forwardly and downwardly inclined stiffener means structurally associated with each of said inner panel portions and cooperating therewith to transmit load thrust from said frame structure directly to one of said column structures, each of said column structures having an upper portion sloped upwardly and rearwardly in substantially the direction of inclination of said inclined brace means to form structural extensions of said brace means, said inner and outer panels extending rearwardly of each of said column structures while maintaining their spaced relationship to provide at least a portion of a hollow roof rail structure.

CARL BREER.
ALEXANDER G. HERRESHOFF.
OLIVER H. CLARK.
ROBERT CADWALLADER.